United States Patent [19]

Khoe et al.

[11] Patent Number: 4,763,969
[45] Date of Patent: Aug. 16, 1988

[54] ADJUSTABLE OPTICAL DEMULTIPLEXER

[75] Inventors: Giok D. Khoe; Antonius J. A. Nicia, both of Eindhoven, Netherlands

[73] Assignee: U.S. Philips Corporation, New York, N.Y.

[21] Appl. No.: 411,929

[22] Filed: Aug. 26, 1982

[30] Foreign Application Priority Data

Sep. 7, 1981 [NL] Netherlands .................. 8104121

[51] Int. Cl.$^4$ .......................... G02B 6/34; G02F 1/13; H04B 9/00
[52] U.S. Cl. .................. 350/96.19; 350/96.16; 350/96.18; 350/96.15; 350/347 R; 350/347 V; 350/352; 350/374; 350/395; 370/2; 370/3
[58] Field of Search ................ 350/330, 331 R, 345, 350/347 V, 348, 352, 372, 374, 380, 394, 395, 347 R, 334, 96.15, 96.16, 96.18, 96.19; 370/1, 2, 3

[56] References Cited

U.S. PATENT DOCUMENTS

| | | | |
|---|---|---|---|
| 3,909,113 | 9/1975 | Stotts | 350/334 X |
| 4,057,719 | 11/1977 | Lewis | 350/96.15 |
| 4,111,524 | 9/1978 | Tomlinson, III | 350/96.19 |
| 4,153,330 | 5/1979 | Tomlinson, III | 350/96.18 |
| 4,208,094 | 6/1980 | Tomlinson, III et al. | 350/96.16 |
| 4,274,706 | 6/1981 | Tangonan | 350/96.16 |
| 4,294,508 | 10/1981 | Husbands | 350/96.15 |
| 4,343,532 | 8/1982 | Palmer | 350/96.16 |
| 4,385,799 | 5/1983 | Soref | 350/96.13 |
| 4,516,837 | 5/1985 | Soref et al. | 350/96.15 X |
| 4,571,024 | 2/1986 | Husbands | 350/96.19 |
| 4,652,080 | 3/1987 | Carter et al. | 350/96.19 |
| 4,718,056 | 1/1988 | Schultheiss | 370/3 |

OTHER PUBLICATIONS

Soref et al., "Total Switching of . . . Device", Optics Lett., vol. 5, No. 4, 4/80, pp. 147–149.
Aoyama et al., "Low-Loss Optical Demultiplexer . . . Region", Applied Optics, vol. 18, No. 16, 8/79, pp. 2834–2836.
Opielka et al., "Low Loss Optical Y-Branch", Electronic Lett., vol. 15, No. 23, pp. 757–759.

Primary Examiner—William L. Sikes
Assistant Examiner—Brian M. Healy
Attorney, Agent, or Firm—Algy Tamoshunas

[57] ABSTRACT

The invention relates to an optical demultiplexer whose "color band" is adjustable, so that the demultiplexer can always be adapted to future standards. The adjustment is performed either by tilting the optical grating with respect to the light beam incident thereon or by deflecting the light by means of a liquid crystal arranged in the light path.

3 Claims, 2 Drawing Sheets

ADJUSTABLE OPTICAL DEMULTIPLEXER

BACKGROUND OF THE INVENTION

The invention relates to an optical demultiplexer which comprises an optical input fibre for transporting a plurality of light signals of different wavelengths, a wavelength-selective member, at least one output member for receiving a light signal in a given waveband, and a lens system which is arranged between the wavelength-selective member on one hand and the input fibre and the output member on the other hand, the arrangement being such that between the input fibre and the output member there exists a low-loss transmission path which is dependent on the wavelength of the light.

A demultiplexer of this kind is known from "Applied Optics", Vol. 18, No. 16, Aug. 15, 1979, pages 2834–2836. The demultiplexer shown therein selects four colour bands (wavebands) from the available colour spectrum, each of said bands being situated around a fixed "central colour" or "central wavelength". In contemporary telecommunication networks, the colour bands in which information is transmitted in the form of light pulses of different colour have not yet been standardized. Therefore, it may be that colour bands will be standardized which do not correspond to the fixed colour bands, so that the demultiplexer can no longer be used in communication networks thus standardized.

SUMMARY OF THE INVENTION

It is an object of the invention to provide an optical demulitplexer in which the described problem is eliminated.

To this end, a demultiplexer in accordance with the invention is characterized in that the orientation of the wavelength-selective member with respect to a light beam incident thereon is adjustable. The output member may be a light-sensitive detector (for example, a photodiode) but also a further optical fibre. In such a demultiplexer the passband (colour band) can be adjusted, for example by means of a simple adjusting screw.

An embodiment of the demultiplexer in accordance with the invention is characterized in that light-deflecting means is arranged between the lens system and the wavelength-selective member. The light-delfecting means preferably comprises a nematic crystal, so that the passband of the demultiplexer can be electonically adjusted by variation of a control voltage applied to the crystal.

A preferred embodiment of a demultiplexer in accordance with the invention is characterized in that between the lens system and the wavelength-selective member there is arranged an optical device for converting non-polarized light into linearly polarized light.

A further embodiment of the optical demultiplexer in accordance with the invention in which the output member is formed by an optical output fibre is characterized in that the diameter of the light-conductive core of the output fibre is at least twice as large as the diameter of the light-conductive core of the input fibre, a diaphragm being arranged between the output fibre and the wave-length selective member. A demulitplexer of this kind offers freedom of choice of the central wavelength as well as the width of the colour band. This is because the width of the colour band is determined by the size of the aperture of the diaphragm.

BRIEF DESCRIPTION OF THE DRAWINGS

Embodiments in accordance with the invention will be described in detail hereinafter with reference to the drawing, in which.

DETAILED DESCRIPTION OF THE INVENTION

Figure 1:
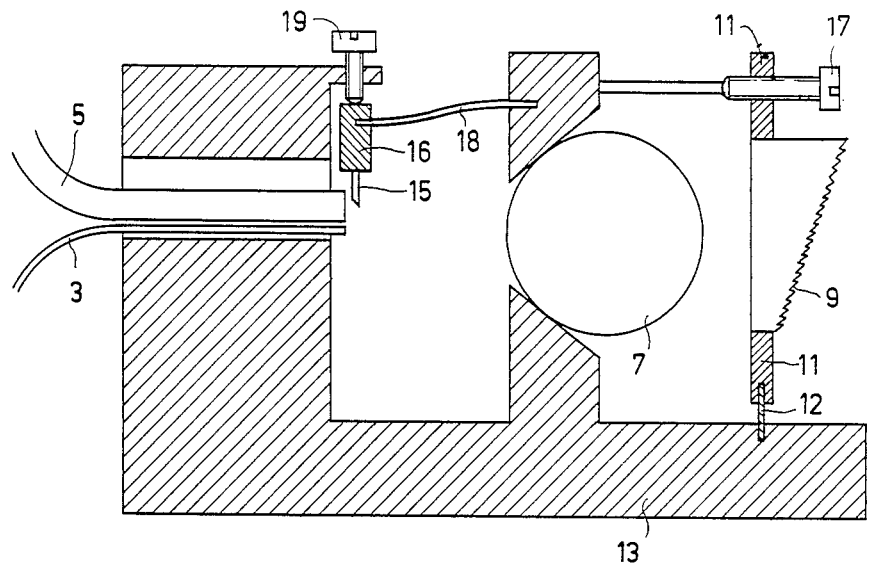
FIG. 1 shows a mechanically adjustable optical demultiplexer in accordance with the invention.

FIG. 1 shows diagrammatically the construction of a mechanically adjustable optical demultiplexer which comprises an input fibre 3, and output fibre 5, a lens 7 and a reflection grating 9. The grating is mounted on a rigid support 11 which is elastically or pivotably connected (for example, by means of a clamped leaf spring 12) to a holder 13 on which the lens 7 and the input and output fibres 3 and 5 are also mounted in known manner.

Using an adjusting screw 17, the grating 9 can be tilted through an angle in order to shift (in the plane of the drawing) the colour spectrum which is projected via the lens 7 in the direction of the fibres 3 and 5. Consequently, the output fibre 5 can receive any desired colour band.

In front of the output fibre 5 there is arranged a (half) diaphragm in the form of a blade 15. The optical fibre 5 can be shielded by the blade 15 to a greater or lesser extent by adjustment of the adjusting screw 17. The blade 15 is mounted in a support 16 which is pressed against an adjusting screw 19 by means of a leaf spring 18. Because the blade 15 is adjusted in the direction of the shift of the colour spectrum, the blade 15 can cut off a part of the colour spectrum which would be received and conducted by the fibre 5. The adjusting means 15, 17 and 19 thus enable adjustment of the central wavelength as well as the width of the colour band which is received and transported by the optical fibre 5. The diameter of the optical fibre 5 is preferably at least twice as large as the diameter of the input fibre 3.

Figures 2A, 2B:
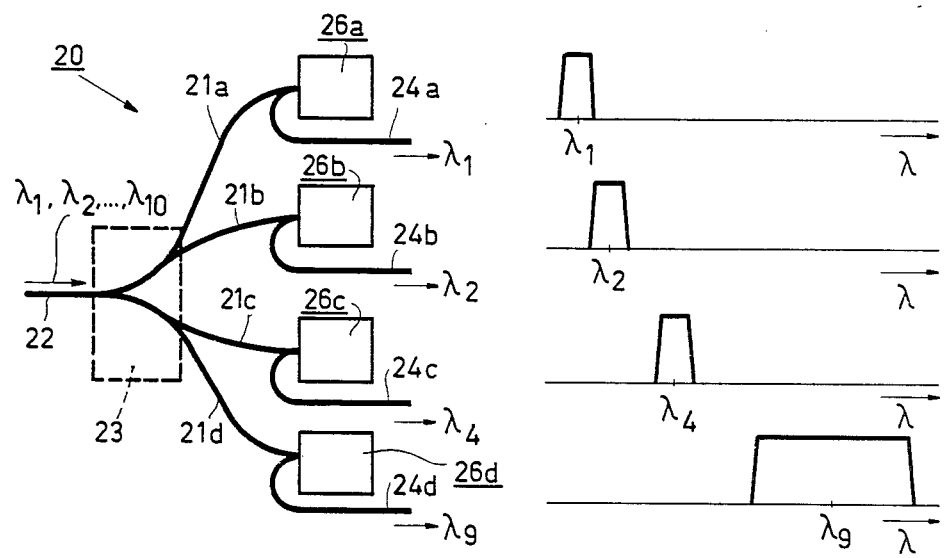
FIGS. 2a and 2b show a four colour band demultiplexer system in accordance with the invention, and a subdivision of the colour band.

FIG. 2a shows a block diagram of a four colour band demulitplexer system 20 in accordance with the invention. The demulitplexer system 20 comprises four adjustable optical demultiplexers 26a, b, c and d, each of which is connected to an optical fibre 21a, b, c and d. The fibres 21a, b, c and d form part of a four-way splitter 23 which itself consists of three known two-way splitters or optical Y-branches. An optical Y-branch comprises two fibres which are ground at an angle as far as the light conductive core and which are butt-jointed to a third fibre by gluing or welding with their ground faces contacting one another (Electronics Letters, Nov. 8, 1979, Vol. 15, No. 23, pages 757–759). It is also possible to connect three or four optical fibres to a single optical fibre 22 in such a manner. (Optical Y-branch arrangements of this kind can also be used as a multiplexer network in which several input fibres are connected to a single output fibre. In that case the propagation direction of the light is opposite to the direction denoted by arrows in FIG. 2. The fibres corresponding to the fibres 21a, b, c and d preferably have a diameter which is smaller than the diameter of the output fibre that corresponds to the fibre 22, the output fibre having a larger numerical aperture than the input fibres).

The thick output fibres 24a, b, c and d which are connected to the demultiplexers 26a, b, c and d are connected to light-sensitive detectors (not shown) in known manner. The input fibre 22 of the demultiplexer system 20 supplies light signals having the wavelengths $\lambda_1, \lambda_2, \ldots \lambda_{10}$. The frequency band can be divided among the four channels as desired by means of the four demultiplexers 26a, b, c and d as shown in FIG. 2b. The demultiplexers 26a, b, c have a narrow-band tuning (narrow slit diaphragm) around the central wavelengths $\lambda_1, \lambda_2, \lambda_4$ and the demultiplexer 26d has a broad-band tuning around the central wavelength $\lambda_9$. The adjustable demultiplexers 26a, b, c and d enable any adjustment with any desired bandwidth (in so far as allowed by the diameter of the output fibres 24a, b, c and d).

Figure 3:
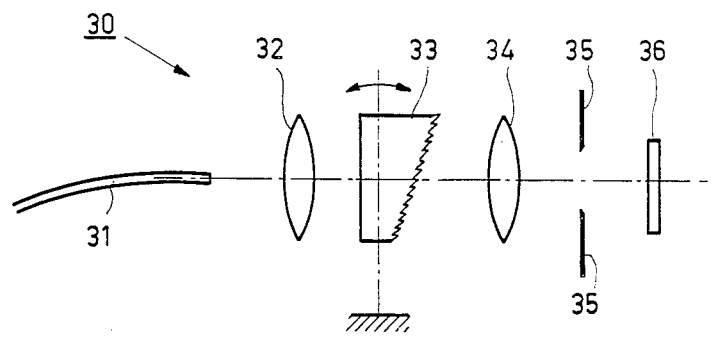
FIG. 3 shows a further demulitplexer in accordance with the invention.

FIG. 3 shows diagrammatically a further optical demultiplexer 30 in accordance with the invention. An input fibre 31 emits a colour spectrum which is incident on an optical transmission grating 33 via an input lens 32. A part of the spectrum which is split in an fan-shape is incident on a light-sensitive detector 36 via the lens 34 and a diaphragm 35. The orientation of the grating 33 with respect to the light beam incident thereon determines which colour (central wavelength) of the entire spectrum will be incident on the detector 36 (for example a light-sensitive diode). The width of the slit diaphragm 35 determines the bandwidth of the demultiplexer device 30. The maximum bandwidth, of course, is determined by the size of the light-sensitive detector 36.

Figure 4:
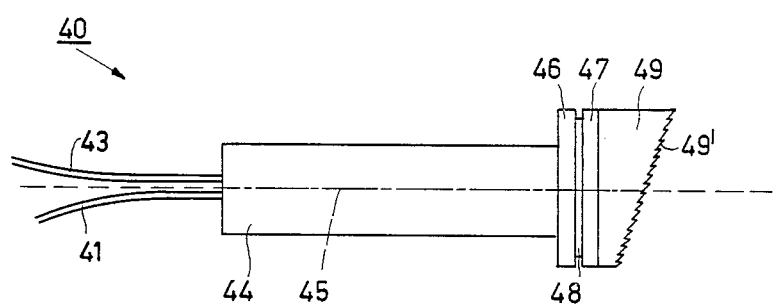
FIG. 4 shows an electrically adjustable optical demulitplexer in accordance with the invention.

FIG. 4 shows an electrically adjustable optical demultiplexer 40 in accordance with the invention. The demultiplexer 40 comprises an input fibre 41 and an output fibre 43 which are connected to a cylindrical lens 44. The lens 44 has a combined axis of symmetry and optical axis 45 and a refractive index which decreases parabolically as the distance from the axis increases (GRIN rod lens). Against the lens 44 there is arranged a light deflector which comprises two electrically controllable nematic crystals 46 and 47 and a plate of crystalline quartz 48 ($\lambda/2$ plate) which is arranged therebetween. From "Optics Letters", Vol. 5, No. 4, April 1980, pages 147-149, it is known that it depends on the polarization direction of the light, whether a nematic crystal influences or does not influence the path of a light beam. Therefore, the plate 48 ($\lambda/2$ plate ) which rotates the polarization direction of the light through an angle of 90° is arranged between the two identical, electrically controlled nematic crystals 46 and 47, Consequently, the light which is deflected in the first crystal 46 and which has a first polarization direction is not deflected in the second crystal 47 and the light having a polarization direction perpendicular to the first direction is deflected in the second crystal 47 and not in the first crystal 46. The deflected light is incident on a reflection grating formed on a face 49' of a prism 49. the reflected light is returned to the lens 44 via the nematic crystals 47 and 46 and the $\lambda/2$ plate 48 (with deflection and rotation of polarization). Part of the colour spectrum thus produced is concentrated by the lens 44 so that it is transported further via the output fibre 43. By application of a different voltage to the crystals 46 and 47, a different part of the colour spectrum can be applied to the output fibre 42 (due to the deflection on the forward and the return path to and from the grating 49', respectively).

Figure 5:
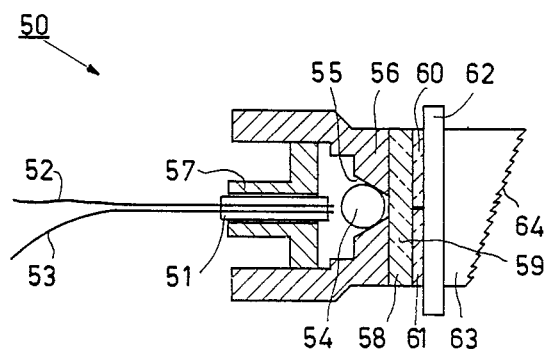
FIG. 5 shows a preferred embodiment of an optical demultiplexer in accordance with the invention.

FIG. 5 shows a preferred embodiment of an optical demultiplexer 50 in accordance with the invention. The demultiplexer 50 comprises one half of a known optical connector in which an input fibre 52 and an output fibre 53 are secured parallel to one another opposite a spherical lens 54 in a holder 51. The lens 54 is arranged on a seat 55 which is formed in a connector body 56 and in which there is also secured a mounting disc 57 in which the holder 51 is arranged. The light supplied via the input fibre 52 and the lens 54 is incident on a plate 58 of a uniaxial anisotropic material, such as calcite, which divides the light beam into two beams of light whose polarization directions extend perpendicularly to one another. This effect is obtained when the propagation direction of the light is perpendicular to the calcite plate 58 and encloses an angle with respect to the optical axis 59 of the plate 58 which is determined by the arc tan of the quotient of the extraordinary refractive index and the ordinary refractive index of the material. The polarization direction of one of the beams of linearly polarized light is rotated through 90° by means of a plate 60 of crystalline quartz ($\lambda/2$ plate), so that actually a single beam of linearly polarized light is obtained. The beam of (linearly polarized) light can thus be deflected by means of only one electrically controllable nematic crystal 62. Between the calcite plate 58 and the nematic crystal 62 there is arranged a filler plate 61 of glass having a refractive index which is adapted to the ordinary refractive index of the plate 58 in order to avoid undesirable refractive index differences (glass/air transition) and hence light reflections. The light beam is incident on a reflection grating 64 formed on a face of a prism 63. The orientation of the plate 58 is preferably such that the electrical vector of the linearly polarized light incident on the grating is directed transversely of the grooves of the grating 64. (The grooves extend perpendicularly to the plane of the drawing). Consequently, a very efficient demultiplexer 50 is obtained, because the reflection grating 64 exhibits the lowest losses in the described circumstances.

The electrodes for controlling the nematic crystal 62 are elongate, narrow electrodes which are directed transversely to the plane of the drawing and which are provided on the side of the lens 54 as well as on the side of the grating 64, a pair of electrodes being arranged on each side of the light beam to be deflected by the crystal 62. When each pair of electrodes is connected to a separate voltage source, the orientation of the crystal material on the side of a first pair of electrodes can be made to differ from the orientation of the crystal material near the other pair of electrodes. Thus, an electrically adjustable refractive index variation is obtained from the first pair of electrodes to the second pair of electrodes.

What is claimed is:

1. An optical demultiplexer comprising an optical input fiber for transporting a plurality of light signals of different wavelengths, an optical output member, a wavelength-selective member disposed in the path of the light emitted by said input fiber, said wavelength-selective member directing a portion of the light incident thereon which is within in a given waveband onto said output member, the waveband of the light that is directed onto said output member being dependent on the orientation of said wavelength-selective member relative to the direction of light incident thereon, a lens arranged between said wavelength-selective member on the one hand and said input fiber and said output member on the other hand, and light deflecting means arranged between said lens and said wavelength-selective member for changing the direction of the light passing therebetween so as to selectively change the waveband of the light that is directed onto said output member.

2. The demultiplexer according to claim 1 wherein said light deflecting means comprises an electrically controllable neumatic crystal.

3. The demultiplexer according to claim 2 wherein said light deflecting means further includes means for converting unpolarized light into linearly polarized light.

* * * * *